US011001707B2

(12) United States Patent
Ozawa et al.

(10) Patent No.: US 11,001,707 B2
(45) Date of Patent: May 11, 2021

(54) POLYLACTIC ACID COMPOSITION, FORMED ARTICLE OBTAINED FROM POLYLACTIC ACID COMPOSITION, AND METHOD FOR PRODUCING POLYLACTIC ACID COMPOSITION

(71) Applicant: TEIJIN LIMITED, Osaka (JP)

(72) Inventors: Suguru Ozawa, Osaka (JP); Ryuji Nonokawa, Osaka (JP); Osamu Uemura, Osaka (JP); Masaya Shibano, Osaka (JP); Shinichiro Shoji, Osaka (JP)

(73) Assignee: TEIJIN LIMITED, Osaka (JP)

( * ) Notice: Subject to any disclaimer, the term of this patent is extended or adjusted under 35 U.S.C. 154(b) by 811 days.

(21) Appl. No.: 15/322,841

(22) PCT Filed: Jun. 30, 2015

(86) PCT No.: PCT/JP2015/069367
§ 371 (c)(1),
(2) Date: Dec. 29, 2016

(87) PCT Pub. No.: WO2016/002965
PCT Pub. Date: Jan. 7, 2016

(65) Prior Publication Data
US 2017/0130047 A1 May 11, 2017

(30) Foreign Application Priority Data
Jul. 4, 2014 (JP) ............................ JP2014-138737

(51) Int. Cl.
*C08L 67/04* (2006.01)
*C08K 5/057* (2006.01)
*C08K 3/24* (2006.01)
*C08G 63/08* (2006.01)
*C08K 5/00* (2006.01)
*C08K 5/098* (2006.01)

(52) U.S. Cl.
CPC .............. *C08L 67/04* (2013.01); *C08G 63/08* (2013.01); *C08K 3/24* (2013.01); *C08K 5/0091* (2013.01); *C08K 5/057* (2013.01); *C08K 5/098* (2013.01); *C08L 2201/08* (2013.01); *C08L 2205/025* (2013.01); *C08L 2205/24* (2013.01)

(58) Field of Classification Search
CPC ........ C08K 3/24; C08K 5/0091; C08K 5/057; C08K 5/098; C08K 5/138; C08K 5/49; C08L 67/04; C08L 2201/08; C08L 2205/025; C08L 2205/24; C08L 101/16; C08G 63/08
See application file for complete search history.

(56) References Cited

U.S. PATENT DOCUMENTS

| 4,719,246 A | 1/1988 | Murdoch et al. | |
| 2007/0299170 A1* | 12/2007 | Ozawa | C08K 5/53 524/132 |
| 2010/0093888 A1* | 4/2010 | Endo | C08K 5/29 523/124 |
| 2011/0224342 A1* | 9/2011 | Masuda | C08J 5/18 524/148 |
| 2012/0289625 A1* | 11/2012 | Matsuno | C07D 273/08 523/451 |
| 2012/0296017 A1* | 11/2012 | Tsuboi | C08J 3/201 524/94 |
| 2013/0231435 A1* | 9/2013 | Hironaka | C08L 23/02 524/451 |
| 2015/0259504 A1 | 9/2015 | Takahashi et al. | |

FOREIGN PATENT DOCUMENTS

| CN | 102164993 A | 8/2011 | |
| EP | 2330148 A1 | 6/2011 | |
| JP | 63-241024 A | 10/1988 | |
| JP | 2003-192884 A | 7/2003 | |
| JP | 2008-248162 A | 10/2008 | |
| JP | 2009-203576 A | 9/2009 | |
| JP | 2009-203582 A | 9/2009 | |
| JP | 2010-83906 A | 4/2010 | |
| JP | 2010-90239 A | 4/2010 | |
| JP | 2012-001618 * | 6/2010 | .............. C08L 67/02 |
| JP | 2011-46842 A | 3/2011 | |
| JP | 2011-153262 A | 8/2011 | |
| TW | 201425460 A | 7/2014 | |

(Continued)

OTHER PUBLICATIONS

Communication dated, Jan. 19, 2018, from the State Intellectual Property Office of the P.R.C in counterpart application No. 201580036586.X.
Communication dated Jun. 26, 2017 from the European Patent Office in counterpart application No. 15814165.5.
Hideto Tsuji, et al., "Stereocomplex Formation between Enantiomeric Poly(lactic acid)s. 3. Calorimetric Studies on Blend Films Cast from Dilute Solution", Macromolecules, 1991, pp. 5651-5656, vol. 24.
International Search Report for PCT/JP2015/069367 dated Oct. 6, 2015 [PCT/ISA/210].
Communication dated Dec. 31, 2019 from the Intellectual Property Office of India in application No. 201617043486.

(Continued)

*Primary Examiner* — Monique R Peets
(74) *Attorney, Agent, or Firm* — Sughrue Mion, PLLC

(57) ABSTRACT

Even when a tin-based polymerization catalyst and a phosphorus-based compound are present in a poly-L-lactic acid (A) and a poly-D-lactic acid (B), by using a specific proportion of an organic acid metal salt or an organic metal salt for stereocomplex crystallization, a stereocomplex polylactic acid composition having a high stereocomplex crystallinity and a high stereocomplex crystal melting point, a small stereocomplex crystal melting point depression even after remelting, a small decrease in the molecular weight, excellent forming processability, and also heat resistance can be provided.

20 Claims, No Drawings

(56) References Cited

FOREIGN PATENT DOCUMENTS

WO 2014057766 A1 4/2014

OTHER PUBLICATIONS

Communication dated Jun. 18, 2019, from the Japanese Patent Office in counterpart Application No. 2016-531496.
Communication dated Dec. 24, 2019 from the Japan Patent Office in application No. 2016-531496.

\* cited by examiner

POLYLACTIC ACID COMPOSITION, FORMED ARTICLE OBTAINED FROM POLYLACTIC ACID COMPOSITION, AND METHOD FOR PRODUCING POLYLACTIC ACID COMPOSITION

CROSS REFERENCE TO RELATED APPLICATIONS

This application is a National Stage of International Application No. PCT/JP2015/069367, filed on Jun. 30, 2015 (which claims priority from Japanese Patent Application No. 2014-138737, filed on Jul. 4, 2014), the contents of which are incorporated herein by reference in their entirety.

TECHNICAL FIELD

The present invention relates to a polylactic acid composition. More specifically, it relates to a polylactic acid composition, a formed article obtained from a polylactic acid composition, and a method for producing a polylactic acid composition.

BACKGROUND ART

In recent years, from the viewpoint of global environmental protection, biodegradable polymers, which degrade in the natural environment, have been attracting attention and studied all over the world. As biodegradable polymers, polyhydroxyalkanoates, polycaprolactones, polyglycolic acids, polybutylene succinates, polylactic acids, and the like are known. Polylactic acids are obtained from lactic acid, which is obtained from a biologically derived raw material, or derivatives thereof, and thus have high biological safety and serve as eco-friendly polymer materials. Therefore, as formed articles made of a polylactic acid, the development of fibers, films, and injection-molded products has been advanced. In addition, applications in the medical field, such as surgical sutures, sustained-release capsules, and reinforcing materials for bone fracture, have also been examined.

However, polylactic acids have low melting point, and thus their use as fibers, films, or various molded articles is limited. Moreover, the crystallization rate is also low, and thus it is said that their forming processability is inferior as compared with general plastics.

Meanwhile, it is known that by mixing a poly-L-lactic acid and a poly-D-lactic acid in solution or melt form, a polylactic acid having a stereocomplex crystal phase (hereinafter sometimes referred to as stereocomplex polylactic acid) is formed (PTL 1 and NPL 1). It is also known that such a stereocomplex polylactic acid has a melting point of 200 to 230° C., which is higher as compared with poly-L-lactic acids or poly-D-lactic acids, and also shows higher crystallinity. Therefore, stereocomplex polylactic acids may provide a wider range of usable applications than by the low-melting-point, low-crystallinity polylactic acids described above. Also with respect to the low crystallization rate, which is one of the drawbacks of polylactic acids, it is known that use of a stereocomplex polylactic acid leads to an improved crystallization rate.

However, a stereocomplex polylactic acid does not show single crystals but is a mixed composition composed of a poly-L-lactic acid and poly-D-lactic acid crystal phase (hereinafter sometimes referred to as homocrystal phase) and a stereocomplex polylactic acid crystal phase (stereocomplex crystal phase), and, usually, two peaks are observed: a low-melting-point crystal melting peak having a peak temperature of less than 190° C. corresponding to the melting of the homocrystal phase, and a high-melting-point crystal melting peak having a peak temperature of 190° C. or more corresponding to the melting of the stereocomplex crystal phase. Therefore, the heat resistance is on the same level as that of ordinary polylactic acids, and, in addition, the crystallinity or crystallization rate is not significantly improved either. Thus, it cannot be said that the original physical properties of stereocomplex polylactic acids have been sufficiently exerted.

Meanwhile, in order for a stereocomplex polylactic acid to sufficiently exert its heat resistance, PTL 2 describes a polylactic acid composition using a crystallization nucleator, such as a phosphate metal salt, and including not a homocrystal phase but only a stereocomplex crystal phase having a crystal melting point of 209° C.

CITATION LIST

Patent Literature

PTL 1: JP-A-63-241024
PTL 2: JP-A-2003-192884
NPL 1: Macromolecules, 24, 5651 (1991)

SUMMARY OF INVENTION

Technical Problem

Incidentally, a poly-L-lactic acid and a poly-D-lactic acid to serve as raw materials for producing a stereocomplex polylactic acid usually contain certain kinds of polymerization catalysts, and a phosphorus-based catalyst deactivator may be added to deactivate them, or a phosphorus-based antioxidant may be added to suppress coloring, for example. The present inventors have found that in such a case, when a stereocomplex polylactic acid is produced using them as raw materials, the stereocomplex crystallinity may not be sufficient, or, even if the stereocomplex crystallinity is high, it may happen that the melting point of stereocomplex crystals itself is low or the molecular weight decreases; therefore, it is difficult to produce a satisfactory stereocomplex polylactic acid composition.

In order to deal with this problem, there has been a demand for a method for stably producing a stereocomplex polylactic acid having a high stereocomplex crystallinity and a high stereocomplex crystal melting point, a small stereocomplex melting point depression during remelting, a small decrease in the molecular weight, excellent forming processability, and also heat resistance, even in the case where a poly-L-lactic acid and a poly-D-lactic acid containing a phosphorus-based catalyst deactivator, a phosphorus-based antioxidant, or like additives are used as raw materials.

An object of the invention is to provide a novel stereocomplex polylactic acid composition.

Another object of the invention is to provide a stereocomplex polylactic acid composition having excellent forming processability and excellent heat resistance.

Another object of the invention is to provide a formed article obtained from a polylactic acid composition.

Still another object of the invention is to provide a method for stably producing the stereocomplex polylactic acid composition described above.

Solution to Problem

The present inventors have conducted extensive research to solve the above problems in the case where a tin-based polymerization catalyst for producing a polylactic acid and also a phosphorus-based compound, such as a phosphorus-based catalyst deactivator for deactivating the catalyst or a phosphorus-based antioxidant for suppressing the coloring of the polylactic acid, are contained. As a result, they have ascertained that it is important to use an organic acid metal salt or an organic metal salt, or both of them, for stereocomplex crystallization. They have found that when an organic acid metal salt or an organic metal salt is used, stereocomplex crystals grow preferentially, and, as a result, a stereocomplex polylactic acid having a high stereocomplex crystallinity and a high stereocomplex melting point, in which the stereocomplex crystal melting point depression during remelting and a decrease in the molecular weight can be suppressed, can be suitably obtained, and thus accomplished the invention.

That is, the invention is as follows.

[1] A polylactic acid composition containing a stereocomplex polylactic acid, the stereocomplex polylactic acid containing a poly-L-lactic acid (A) and a poly-D-lactic acid (3) and having a stereocomplex crystallinity (S) of 90% or more as defined by the following equation (a):

$$S=\Delta H_{sc} \times 100/(\Delta H_{ho}+\Delta H_{sc}) \quad (a)$$

wherein $\Delta H_{sc}$ represents the enthalpy (J/g) of stereocomplex crystals in the polylactic acid composition, and $\Delta H_{ho}$ represents the enthalpy (J/g) of homocrystals in the polylactic acid composition, the content ratio between the poly-L-lactic acid (A) and the poly-D-lactic acid (B) being within a range of 80/20 to 20/80 (mass ratio), the polylactic acid composition containing a tin-based compound, a phosphorus-based compound, and further at least one of a metal organic acid metal salt of at least one member selected from alkali metals and alkaline earth metals, and an organic metal salt, in the case where the kind of metal of the organic acid metal salt is an alkali metal, the molar ratio of the phosphorus (P) atom to the organic acid metal salt being within a range of 0.5 to 1.5, in the case where the kind of metal of the organic acid metal salt is an alkaline earth metal, the molar ratio of the phosphorus (P) atom to the organic acid metal salt being within a range of 0.1 to 1.0, in the case of the organic metal salt, the molar ratio of the phosphorus (P) atom to the organic metal salt being within a range of 0.5 to 2.2.

[2] The polylactic acid composition according to [1] above, wherein the organic acid of the organic acid metal salt is a $C_{2-24}$ fatty acid.

[3] The polylactic acid composition according to [1] above, wherein the organic acid of the organic acid metal salt is a $C_{7-12}$ aromatic acid.

[4] The polylactic acid composition according to [1] above, wherein the organic metal salt is at least one kind of metal alkoxide selected from the group consisting of $C_{1-10}$ aliphatic alkoxides and $C_{6-15}$ aromatic alkoxides.

[5] The polylactic acid composition according to [1] above, wherein the tin-based compound is at least one member selected from the group consisting of tin octylate and tin alkoxides containing a $C_{1-10}$ fatty alcohol as a constituent.

[6] The polylactic acid composition according to [1] above, wherein the phosphorus-based compound is at least one kind of phosphorus compound selected from the group consisting of phosphorous acid, phosphoric acid, phosphonic acid, phosphites, phosphates, and phosphonates.

[7] The polylactic acid composition according to any one of [1] to [6] above, wherein the amount of Sn in terms of metal is 0.02 parts by mass or less relative to 100 parts by mass of the total of the poly-L-lactic acid and the poly-D-lactic acid, and the mass ratio of the phosphorus atom from the phosphorus-based compound to the tin atom from the tin-based compound (P/Sn) is within a range of 0.15 to 5.0.

[8] The polylactic acid composition according to any one of [1] to [7] above, wherein the polylactic acid composition has a melting point ($T_{sc}$) from stereocomplex crystals of 210° C. or more, and, in DSC measurement under the following conditions, the difference between $T_{sc}$ measured after three cycles and $T_{sc}$ measured after one cycle ($\Delta T_{sc}$) is 8° C. or less;

DSC Measurement Conditions:

(i) heating from 30° C. to 260° C. (heating rate: 20° C./min);

(ii) holding at 260° C. for 1 min;

(iii) cooling from 260° C. to 30° C. (cooling rate: 20° C./min); and (iv) the (i) to (iii) are taken as one cycle, and the cycle is repeated three times as three cycles.

[9] The polylactic acid composition according to any one of [1] to [8] above, wherein the stereocomplex polylactic acid has a weight average molecular weight (Mw) of 100,000 or more.

[10] The polylactic acid composition according to any one of [1] to [9] above, containing 0.1 to 10 parts by mass of a compound having at least one carbodiimide group in one molecule relative to 100 parts by mass of the polylactic acid composition.

[11] The polylactic acid composition according to any one of [1] to [10] above, further containing an organic acid from the organic acid metal salt.

[12] A formed article obtained from the polylactic acid composition according to any one of [1] to [11] above.

[13] A method for producing a polylactic acid composition containing a stereocomplex polylactic acid, the stereocomplex polylactic acid containing a poly-L-lactic acid (A) and a poly-D-lactic acid (B) and having a stereocomplex crystallinity (S) of 90% or more as defined by the following equation (a):

$$S=\Delta H_{sc} \times 100/(\Delta H_{ho}+\Delta H_{sc}) \quad (a)$$

wherein $\Delta H_{sc}$ represents the enthalpy (J/g) of stereocomplex crystals in the polylactic acid composition, and $\Delta H_{ho}$ represents the enthalpy (J/g) of homocrystals in the polylactic acid composition, the content ratio between the poly-L-lactic acid (A) and the poly-D-lactic acid (B) being within a range of 80/20 to 20/80 (mass ratio), the method including at least the following steps:

(i) a step of preparing a mixture containing a poly-L-lactic acid (A), a poly-D-lactic acid (B), a tin-based compound, and a phosphorus-based compound;

(ii) a step of adding at least one of an organic acid metal salt of at least one member selected from alkali metals and alkaline earth metals, and an organic metal salt to the mixture of (i) in such a manner that the following conditions are satisfied: in the case where the kind of metal of the organic acid metal salt is an alkali metal, the molar ratio of the phosphorus (P) atom to the organic acid metal salt is within a range of 0.5 to 1.5; in the case where the kind of metal of the organic acid metal salt is an alkaline earth metal, the molar ratio of the phosphorus (P) atom to the organic acid metal salt is within a range of 0.1 to 1.0; and in the case of the organic metal salt, the molar ratio of the phosphorus (P) atom to the organic metal salt is within a range of 0.5 to 2.2; and (iii) a step of, after the step (ii), melt-kneading the mixture at a temperature of 260 to 300° C.

[14] The method for producing a polylactic acid composition according to [13] above, wherein in the step (i), the mass ratio of the phosphorus atom from the phosphorus-based compound to the tin atom from the tin-based compound (P/Sn) is within a range of 0.15 to 5.0.

Advantageous Effects of Invention

According to the invention, even when a tin-based polymerization catalyst and a phosphorus-based compound are present in the poly-L-lactic acid (A) and the poly-D-lactic acid (B), by using a specific proportion of an organic acid metal salt or an organic metal salt for stereocomplex crystallization, a stereocomplex polylactic acid composition having a high stereocomplex crystallinity and a high stereocomplex crystal melting point, a small stereocomplex crystal melting point depression even after remelting, a small decrease in the molecular weight, excellent forming processability, and also heat resistance can be provided. The stereocomplex polylactic acid composition of the invention has a small depression in the stereocomplex crystal melting point, and thus is extremely promising as injection-molded products, films, fibers, and various formed products having excellent heat resistance.

DESCRIPTION OF EMBODIMENTS

Hereinafter, modes for carrying out the invention will be described in detail. Incidentally, these descriptions and examples are illustrative of the invention, and do not limit the scope of the invention.

<Polylactic Acid>

The polylactic acid in the invention is a high-melting-point polylactic acid having stereocomplex crystals (hereinafter sometimes referred to as stereocomplex polylactic acid), and can be produced by solution-mixing or melt-mixing a poly-L-lactic acid and a poly-D-lactic acid. Hereinafter, polylactic acids (poly-L-lactic acid and poly-D-lactic acid) will be described.

A polylactic acid is a polymer mainly containing an L-lactic acid unit or D-lactic acid unit represented by the following formula or a combination thereof. Polylactic acids include poly-L-lactic acids and poly-D-lactic acids.

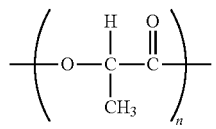

A poly-L-lactic acid is a polymer mainly containing an L-lactic acid unit. A poly-L-lactic acid contains the L-lactic acid unit preferably in a proportion of 90 to 100 mol %, more preferably 95 to 100 mol %, and still more preferably 97 to 100 mol %. As other units, a D-lactic acid unit and units other than lactic acid can be mentioned. The proportion of the D-lactic acid unit and units other than lactic acid is preferably 0 to 10 mol %, more preferably 0 to 5 mol %, and still more preferably 0 to 3 mol %.

In addition, a poly-D-lactic acid is a polymer mainly containing a D-lactic acid unit. A poly-D-lactic acid contains the D-lactic acid unit preferably in a proportion of 90 to 100 mol %, more preferably 95 to 100 mol %, and still more preferably 97 to 100 mol %. As other units, an L-lactic acid unit and units other than lactic acid can be mentioned. The proportion of the L-lactic acid unit and units other than lactic acid is 0 to 10 mol %, preferably 0 to 5 mol %, and still more preferably 0 to 3 mol %.

Examples of units other than lactic acid in a poly-L-lactic acid or a poly-D-lactic acid include units derived from dicarboxylic acids having two or more ester-bond-forming functional groups, polyhydric alcohols, hydroxycarboxylic acids, lactones, and the like, as well as units derives from various polyesters, various polyethers, various polycarbonates, and the like composed of these various constituents.

Examples of dicarboxylic acids include succinic acid, adipic acid, azelaic acid, sebacic acid, terephthalic acid, and isophthalic acid. Examples of polyhydric alcohols include aliphatic polyhydric alcohols such as ethylene glycol, propylene glycol, butanediol, pentanediol, dihydroxyhexane, octanediol, glycerin, sorbitan, neopentyl glycol, diethylene glycol, triethylene glycol, polyethylene glycol, and polypropylene glycol, and also aromatic polyhydric alcohols such as ethylene oxide-added bisphenol. Examples of hydroxycarboxylic acids include glycolic acid and hydroxybutyric acid. Examples of lactones include glycolide, ε-caprolactone glycolide, ε-caprolactone, β-propiolactone, δ-butyrolactone, β- or γ-butyrolactone, pivalolactone, and δ-valerolactone.

It is preferable that the poly-L-lactic acid and the poly-D-lactic acid in the invention have an optical purity of 97% or more. When the optical purity is 97% or more, the improvement of the melting point can be expected.

The optical purity of the poly-L-lactic acid and that of the poly-D-lactic acid were determined as follows. In the case of a poly-L-lactic acid, the optical purity was determined from the ratio between the L-lactic acid unit, which is the main structural unit, and the partial D-lactic acid unit. First, 5 mL of 5 M sodium hydroxide and 2.5 mL of methanol were added to 1 g of a sample, hydrolyzed with heating and stirring at 40° C., and then neutralized with 1 M sulfuric acid. 1 mL of the neutralized solution was diluted 25-fold to adjust the concentration. The solution was subjected to high-speed liquid chromatography (HPLC) to measure the detection peak areas of L-lactic acid and D-lactic acid under UV light at 254 nm, and, from the mass proportion of the L-lactic acid unit [L] (%) and the mass proportion of the D-lactic acid unit [D](%) forming the polylactic acid polymer, each optical purity (%) was calculated from the following equation.

Optical purity (%) of poly-L-lactic acid=100×[L]/ ([L]+[D])

Optical purity (%) of poly-D-lactic acid=100×[D]/ ([L]+[D])

A polylactic acid can be produced by a known method. For example, it can be produced by subjecting L-lactide or D-lactide to heating and ring-opening polymerization in the presence of a metal-containing catalyst. It can also be produced by crystallizing a low-molecular-weight polylactic acid containing a metal-containing catalyst, followed by heating and solid-phase polymerization under reduced pressure or in an inert gas stream. Further, it can also be produced by a direct polymerization method, in which lactic acid is subjected to dehydration condensation in the presence or absence of an organic solvent.

The polymerization reaction can be carried out in a conventionally known reaction vessel. For example, a vertical reaction vessel equipped with a high-viscosity stirring blade, such as a helical ribbon blade, may be used alone, or it is also possible to use such vessels in parallel. As a polymerization initiator, an alcohol may be used. It is preferable that such an alcohol does not inhibit the polymerization of the polylactic acid and is nonvolatile. For example, decanol, dodecanol, tetradecanol, hexadecanol, octadecanol, ethylene glycol, triethylene glycol, benzyl alcohol, and the like may be preferably used.

In a solid-state polymerization method, a lactic acid polyester having a relatively low molecular weight, which is obtained by the ring-opening polymerization method or lactic-acid direct polymerization method described above, is used as a prepolymer. It can be said that in terms of preventing fusion, a mode in which the prepolymer is previously crystallized in a temperature range not lower than its glass transition temperature (Tg) and lower than its melting point (Tm) is preferable. The crystallized prepolymer is placed in a fixed vertical reaction vessel or in a reaction vessel which itself rotates, such as a tumbler or a kiln, and heated to a temperature range not lower than the glass transition temperature (Tg) and lower than the melting point (Tm) of the prepolymer. With respect to the polymerization temperature, there is no problem in increasing the temperature gradually with the progress of polymerization. In addition, it is also preferable to reduce the pressure inside the reaction vessel for the purpose of efficiently removing water generated during solid-state polymerization, or also use a method in which a heated inert gas stream is circulated.

Generally, as metal-containing catalysts used for producing a polylactic acid, catalysts containing at least one member selected from tin, aluminum, zinc, calcium, titanium, germanium, manganese, magnesium, and rare earth elements are known. In the invention, the metal-containing catalyst for producing a poly-L-lactic acid or a poly-D-lactic acid is a tin-containing catalyst containing tin (Sn). Specific examples thereof include tin-based compounds such as stannous chloride, stannous bromide, stannous iodide, stannous sulfate, stannic oxide, tin myristate, tin octylate, tin stearate, tetraphenyl tin, tin methoxide, tin ethoxide, and tin butoxide.

The amount of tin-containing catalyst used is, in terms of the Sn atom, preferably 0.02 parts by mass or less, more preferably 0.0001 to 0.02 parts by mass, relative to 100 parts by mass of the poly-L-lactic acid or the poly-D-lactic acid. Further, considering the reactivity and also the color tone and thermal stability of the resulting poly-L-lactic acid or poly-D-lactic acid, the amount is still more preferably 0.0001 to 0.01 parts by mass, and particularly preferably 0.0001 to 0.005. The amount of tin-containing catalyst used is, in terms of the Sn atom, preferably 0.01 parts by mass or less, more preferably 0.0001 to 0.01 parts by mass, relative to 100 parts by mass of the total of the poly-L-lactic acid and the poly-D-lactic acid.

It is preferable that the tin-based compound is deactivated with a deactivator composed of a phosphorus-based compound after the completion of lactide polymerization. Such deactivation is advantageous in preventing a decrease in the molecular weight of the polylactic acid.

As such deactivators, phosphorus-based compounds are preferably used, for example. Examples thereof include organic ligands consisting of chelate ligands having an imino group and capable of coordinating with a polymerization metal catalyst; low-oxidation-number phosphoric acids having an oxidation number of 5 or less, such as dihydridooxophosphoric (I) acid, dihydridotetraoxodiphosphoric (II,II) acid, hydridotrioxophosphoric (III) acid, dihydridopentaoxodiphosphoric (III) acid, hydridopentaoxodiphosphoric (II,IV) acid, dodecaoxohexaphosphoric (III) acid, hydridooctaoxotriphosphoric (III,IV,IV) acid, octaoxotriphosphoric (IV,III,IV) acid, hydridohexaoxodiphosphoric (III,V) acid, hexaoxodiphosphoric (IV) acid, decaoxotetraphosphoric (IV) acid, hendecaoxotetraphosphoric (IV) acid, and enneaoxotriphosphoric (V,IV,IV) acid; acids represented by the formula $xH_2O \cdot yP_2O_5$, including orthophosphcric acid wherein $x/y=3$, polyphosphoric acids wherein $2>x/y>1$, which are called diphosphoric acid, triphosphoric acid, tetraphosphoric acid, pentaphosphoric acid, and so forth depending on the degree of condensation, as well as mixtures thereof, metaphosphoric acids represented by $x/y=1$, especially trimetaphosphoric acid and tetrametaphosphoric acid, and ultraphosphoric acids represented by $1>x/y>0$ and having a network structure with part of the phosphorus pentaoxide structure remaining (these are sometimes collectively referred to as metaphosphoric acid-based compounds), as well as acidic salts of these acids; partial esters and complete esters of monohydric and polyhydric alcohols and polyalkylene glycols; phosphites; and phosphono-substituted lower aliphatic carboxylic acid derivatives.

In terms of catalyst deactivation ability, acids represented by the formula $xH_2O \cdot yP_2O_5$, including orthophosphoric acid wherein $x/y=3$, polyphosphoric acids wherein $2>x/y>1$, which are called diphosphoric acid, triphosphoric acid, tetraphosphoric acid, pentaphosphoric acid, and so forth depending on the degree of condensation, as well as mixtures thereof, metaphosphoric acids represented by $x/y$ 1, especially trimetaphosphoric acid and tetrametaphosphoric acid, and ultraphosphoric acids represented by $1>x/y>0$ and having a network structure with part of the phosphorus pentaoxide structure remaining (these are sometimes collectively referred to as metaphosphoric acid-based compounds), as well as acidic salts of these acids; partial esters of monohydric and polyhydric alcohols and polyalkylene glycols; phosphorus oxoacid and acidic esters thereof; phosphono-substituted lower aliphatic carboxylic acid derivatives; and the above metaphosphoric acid-based compounds are preferably used.

Metaphosphoric acid-based compounds used in the invention include a cyclic metaphosphoric acid having about 3 to 200 phosphoric acid units condensed, an ultra-region metaphosphoric acid having a three-dimensional network structure, and an alkali metal salt, an alkaline earth metal salt, and an onium salt thereof.

Among them, cyclic sodium metaphosphate, ultra-region sodium metaphosphate, dihexylphosphonoethyl acetate (hereinafter sometimes abbreviated as DHPA) as a phosphono-substituted lower aliphatic carboxylic acid derivative can be mentioned. Examples of phosphites include 2,4,8,10-tetra-t-butyl-6-[3-(3-methyl-4-hydroxy-5-t-butylphenyl)propoxy]dibenzo[d,f] [1,3,2]dioxaphosphepine.

It is preferable that the content of the deactivator is, in terms of the phosphorus (P) atom of the phosphorus-based compound, within a range of 0.001 to 0.05 parts by mass relative to 100 parts by mass of the poly-L-lactic acid or the poly-D-lactic acid. When the content is less than 0.001 parts by mass, the catalyst deactivation effect is small, causing a decrease in the molecular weight. Further, when the content is more than 0.05 parts by mass, decomposition is conversely promoted, causing a decrease in the molecular weight.

It is preferable that the molar ratio of the phosphorus atom (P) of the phosphorus-based compound to the tin atom (Sn)

of the tin-based compound (P/Sn ratio) is within a range of 0.15 to 5.0. The reason for this is as described above.

A stereocomplex polylactic acid obtained from a poly-L-lactic acid and a poly-D-lactic acid is a polylactic acid containing complex-phase crystals, whose main chain is formed of a poly-L-lactic acid unit and a poly-D-lactic acid unit. Such a polylactic acid having a stereocomplex crystal phase shows a crystal melting peak at 190° C. or more in differential scanning calorimeter (DSC) measurement.

The stereocomplex crystallinity (S) of the stereocomplex polylactic acid in the invention is 90% or more, preferably more than 97%, and more preferably 100%, as defined by the following equation (a).

$$S = \Delta H_{sc} \times 100 / (\Delta H_{ho} + \Delta H_{sc}) \tag{a}$$

Here, $\Delta H_{sc}$ represents the enthalpy (J/g) of stereocomplex crystals in the stereocomplex polylactic acid in the polylactic acid composition, and $\Delta H_{ho}$ represents the enthalpy (J/g) of homocrystals in the stereocomplex polylactic acid in the polylactic acid composition.

That is, when the stereocomplex polylactic acid has S within the above range, formed products obtained using the polylactic acid composition of the invention have excellent heat resistance and wet-heat resistance.

It is preferable that the polylactic acid has crystallinity, and it is preferable that the stereocomplex crystal content (Sc) is 50% or more as defined by the following equation (b) using the diffraction peak intensity ratio determined by wide-angle X-ray diffraction (WAXD) measurement.

$$Sc\ (\%) = [\Sigma ISCI / (\Sigma ISCI + IHM)] \times 100 \tag{b}$$

Here, $\Sigma ISCI = ISC1 + ISC2 + ISC3$, ISCI (I=1 to 3) represents the integrated intensities of diffraction peaks near $2\theta = 12.0°$, $20.7°$, and $24.00$, respectively, and IHM represents the integrated intensity IHM of the diffraction peak near $2\theta = 16.5°$ from homo-phase crystals.

The polylactic acid used in the invention is a mixture of a poly-L-lactic acid and a poly-D-lactic acid in a mass ratio within a range of 80/20 to 20/80. The ratio is preferably 30/70 to 70/30, more preferably 60/40, and still more preferably 50/50. The mass ratio is determined in light of the melting point or various physical properties.

The weight average molecular weight of the polylactic acid is preferably 100,000 or more, more preferably within a range of 100,000 to 1,000,000, still more preferably 100,000 to 500,000, yet more preferably 110,000 to 350,000, and particularly preferably 120,000 to 250,000. The weight average molecular weight is a value measured by gel permeation chromatography (GPC) and expressed in terms of standard polystyrene.

<Production of Polylactic Acid>

The polylactic acid in the invention is a high-melting-point polylactic acid containing stereocomplex crystals, and can be produced by solution-mixing or melt-mixing a poly-L-lactic acid and a poly-D-lactic acid.

As a method for mixing, solution-mixing performed with the poly-L-lactic acid and the poly-D-lactic acid being dissolved in a solvent or melt-mixing performed with the poly-L-lactic acid and the poly-D-lactic acid being melted can be employed. The mass ratio between the poly-L-lactic acid and the poly-D-lactic acid is, as former/latter, 80/20 to 20/80. The mass ratio is determined in light of the melting point or various physical properties.

For example, as a method for melt-kneading, they are kneaded using a tumbler, a V-shaped blender, a super mixer, a Nauta mixer, a Banbury mixer, a kneading roll, or the like, then melt-extruded, or, alternatively, they are directly melt-kneaded and extruded using a single-screw melt-extruder, a vented twin-screw extruder, or the like, for example. In any case, it is preferable that the melt-mixing temperature is higher than the melting point of the resulting polylactic acid containing stereocomplex crystals, preferably more than 260° C., and more preferably 270° C. or more. When the melt-mixing temperature is too high, the poly-L-lactic acid and the poly-D-lactic acid undergo hydrolysis/pyrolysis, resulting in the formation of low-molecular-weight substances, such as lactide; therefore, this is undesirable. From this point of view, the temperature is preferably 300° C. or less, and more preferably 290° C. or less. In addition, the screw rotation speed of the extruder is determined in light of the desired kneadability and the molecular weight of the resulting resin composition, but is generally preferably 10 to 500 rpm, and the melt-kneading time is preferably 1 to 20 minutes.

<Tin-Based Compound>

In the invention, as tin-based compounds, the tin-containing catalysts used for producing a polylactic acid described above can be mentioned. That is, examples thereof include stannous chloride, stannous bromide, stannous iodide, stannous sulfate, stannic oxide, tin myristate, tin octylate, tin stearate, tetraphenyl tin, and tin alkoxides containing a $C_{1-10}$ fatty alcohol as a constituent, such as tin methoxide, tin ethoxide, and tin butoxide. It is preferable that the tin-based compound is at least one member selected from the group consisting of tin octylate and tin alkoxides containing a $C_{1-10}$ fatty alcohol as a constituent.

<Phosphorus-Based Compound>

As phosphorus-based compounds in the invention, in addition to the phosphorus-based compounds to serve as deactivators for deactivating the tin-containing catalyst described above, phosphorous acid, phosphoric acid, phosphonic acid, phosphites, phosphate, and phosphonates, for example, can be mentioned. Specific examples thereof include triphenyl phosphite, trisnonylphenyl phosphite, tricresyl phosphite, triethyl phosphite, tris(2-ethylhexyl) phosphite, tributyl phosphite, tridecyl phosphite, trilauryl phosphite, tris(tridecyl) phosphite, trioleyl phosphite, diphenyl mono(2-ethylhexyl) phosphite, diphenyl monodecyl phosphite, diphenyl mono(tridecyl) phosphite, trilauryl trithiophosphite, diethyl hydrogen phosphite, bis(2-ethylhexyl) hydrogen phosphite, dilauryl hydrogen phosphite, dilauryl hydrogen phosphite, dioleoyl hydrogen phosphite, diphenyl hydrogen phosphite, tetraphenyl dipropyleneglycol diphosphite, bis(decyl)pentaerythritol diphosphite, bis(tridecyl) pentaerythritol diphosphite, tristearyl phosphite, distearyl pentaerythritol diphosphite, tris(2,4-di-tert-butylphenyl) phosphite, ethyl acid phosphate, butyl acid phosphate, dibutyl pyrophosphate, butoxyethyl acid phosphate, 2-ethylhexyl acid phosphate, isotridecyl acid phosphate, oleyl acid phosphate, tetracosyl acid phosphate, 2-hydroxyethyl methacrylate acid phosphate, dibutyl phosphate, and bis(2-ethylhexyl) phosphate. A single kind or two or more kinds of these compounds may be contained.

<Organic Acid Metal Salt>

In the invention, an organic acid metal salt or an organic metal salt, or a combination of the two, is used. By use thereof, the stereocomplex crystallinity (S) of the stereocomplex polylactic acid can be enhanced. As the organic acid metal salt, at least one kind of metal selected from alkali metals and alkaline earth metals is contained. As such organic acid metal salts, fatty acid metal salts wherein the organic acid is a $C_{2-24}$ fatty acid, aromatic acid metal salts wherein the organic acid is a $C_{7-12}$ aromatic acid, and carbonic acid metal salts can be mentioned. In addition, as organic metal salts for use in the invention, metal alkoxides can be mentioned.

As fatty acid metal salts, those having a $C_{2-18}$ fatty acid are preferable. Specific examples thereof include lithium acetate, potassium acetate, sodium acetate, calcium acetate, magnesium acetate, barium acetate, lithium propionate, potassium propionate, sodium propionate, calcium propionate, magnesium propionate, barium propionate, lithium butanoate, potassium butanoate, sodium butanoate, calcium butanoate, magnesium butanoate, barium butanoate, lithium pentanoate, potassium pentanoate, sodium pentanoate, calcium pentanoate, magnesium pentanoate, barium pentanoate, lithium caproate, potassium caproate, sodium caproate, calcium caproate, magnesium caproate, barium caproate, lithium heptanoate, potassium heptanoate, sodium heptanoate, calcium heptanoate, magnesium heptanoate, barium heptanoate, lithium octanoate, potassium octanoate, sodium octanoate, calcium octanoate, magnesium octanoate, barium octanoate, lithium decanoate, potassium decanoate, decane sodium, calcium decanoate, magnesium decanoate, barium decanoate, lithium laurate, potassium laurate, sodium laurate, calcium laurate, magnesium laurate, barium laurate, lithium myristate, potassium myristate, sodium myristate, calcium myristate, magnesium myristate, barium myristate, lithium palminate, potassium palminate, sodium palminate, calcium palminate, magnesium palminate, barium palminate, lithium margarate, potassium margarate, sodium margarate, calcium margarate, magnesium margarate, barium margarate, lithium stearate, potassium stearate, sodium stearate, calcium stearate, magnesium stearate, barium stearate, potassium oleate, sodium oleate, calcium oleate, magnesium oleate, barium oleate, lithium linoleate, potassium linoleate, sodium linoleate, calcium linoleate, magnesium linoleate, barium linoleate, lithium linolenate, potassium linolenate, sodium linolenate, calcium linolenate, magnesium linolenate, barium linolenate, lithium lactate, potassium lactate, sodium lactate, calcium lactate, magnesium lactate, barium lactate, lithium glycolate, potassium glycolate, sodium glycolate, calcium glycolate, magnesium glycolate, and barium glycolate.

As aromatic acid metal salts, those having a $C_{7-12}$ aromatic acid are preferable. Specific examples thereof include lithium benzoate, potassium benzoate, sodium benzoate, calcium benzoate, magnesium benzoate, barium benzoate, lithium toluate, potassium toluate, sodium toluate, calcium toluate, magnesium toluate, barium toluate, lithium gallate, potassium gallate, sodium gallate, calcium gallate, magnesium gallate, barium gallate, lithium cinnamate, potassium cinnamate, sodium cinnamate, calcium cinnamate, magnesium cinnamate, barium cinnamate, lithium phthalate, potassium phthalate, sodium phthalate, calcium phthalate, magnesium phthalate, barium phthalate, lithium terephthalate, potassium terephthalate, sodium terephthalate, calcium terephthalate, magnesium terephthalate, barium terephthalate, lithium isophthalate, potassium isophthalate, sodium isophthalate, calcium isophthalate, magnesium isophthalate, barium isophthalate, lithium salicylate, potassium salicylate, sodium salicylate, calcium salicylate, magnesium salicylate, barium salicylate, lithium naphthoate, potassium naphthoate, sodium naphthoate, calcium naphthoate, magnesium naphthoate, barium naphthoate, lithium naphthalenedicarboxylate, potassium naphthalenedicarboxylate, sodium naphthalenedicarboxylate, calcium naphthalenedicarboxylate, magnesium naphthalenedicarboxylate, and barium naphthalenedicarboxylate.

Specific examples of carbonic acid metal salts include sodium carbonate, potassium carbonate, lithium carbonate, calcium carbonate, magnesium carbonate, and barium carbonate.

<Organic Metal Salt>

As organic metal salts, metal alkoxides can be mentioned. As metal alkoxides, $C_{1-10}$ aliphatic alkoxides and $C_{6-15}$ aromatic alkoxides are preferable. It is also possible to use a combination of two or more kinds of them. Specific example of aliphatic alkoxides include lithium methoxide, sodium methoxide, lithium ethoxide, sodium ethoxide, calcium ethoxide, barium ethoxide, potassium tert-butoxide, and aluminum triisopropoxide.

In addition, specific examples of aromatic alkoxides include sodium phenoxide, sodium-3,5-dimethoxy phenoxide, and sodium-2-phenyl phenoxide.

<Polylactic Acid Composition>

The polylactic acid composition of the invention contains the tin-based compound, the phosphorus-based compound, the organic acid metal salt or the organic metal salt, and the polylactic acid having a stereocomplex crystallinity (S) of 90% or more. It is also possible that both the organic acid metal salt and the organic metal salt are present.

Here, it is preferable that the content of the phosphorus-based compound in terms of the phosphorus (P) atom is within a range of 0.001 to 0.05 parts by mass relative to 100 parts by mass of the polylactic acid composition. The content is further 0.003 to 0.04 parts by mass, and still more preferably 0.005 to 0.03 parts by mass.

In addition, it is preferable that the content of the organic acid metal salt or the organic metal salt is within a range of 0.01 to 20.0 parts by mass relative to 100 parts by mass of the polylactic acid composition. When the content is within this range, a stereocomplex polylactic acid composition having a high stereocomplex crystallinity and a high stereocomplex crystal melting point, a small stereocomplex crystal melting point depression even after remelting, a small decrease in the molecular weight, excellent forming processability, and also heat resistance can be obtained. The content is further 0.01 to 5.0 parts by mass, and still more preferably 0.01 to 1.5 parts by mass. In the case where both the organic acid metal salt and the organic metal salt are present, it is preferable that the total of the two is within the above range.

In the polylactic acid composition of the invention, in the case where the kind of metal of the organic acid metal salt is an alkali metal, the molar ratio of phosphorus (P) to the organic acid metal salt is within a range of 0.5 to 1.5. The reason for this is that in the case where the ratio of P to the metal salt is small, it is difficult to maintain a molecular weight of 100,000 or more to maintain the mechanical properties, while in the case where the ratio of P to the metal salt is large, the stereocomplex proportion is less than 90%. It is preferable the ratio is within a range of 0.8 to 1.3.

In the polylactic acid composition of the invention, in the case where the kind of metal of the organic acid metal salt is an alkaline earth metal, the molar ratio of phosphorus (P) to the organic acid metal salt is within a range of 0.1 to 1.0. The reason for this is that in the case where the ratio of P to the metal salt is small, it is difficult to maintain a molecular weight of 100,000 or more to maintain the mechanical properties, while in the case where the ratio of P to the metal salt is large, the stereocomplex proportion is less than 90%. It is preferable the ratio is within a range of 0.2 to 0.6.

In the case where the polylactic acid composition of the invention contains an organic metal salt, the molar ratio of phosphorus (P) to the organic metal salt is within a range of 0.5 to 2.2. The reason for this is that in the case where the ratio of P to the metal salt is small, it is difficult to maintain a molecular weight of 100,000 or more to maintain the mechanical properties, while in the case where the ratio of P to the metal salt is large, the stereocomplex proportion is less than 90%. It is preferable the ratio is within a range of 0.5 to 1.0.

Considering the content ratio between the phosphorus-based compound and the tin-based compound, it is preferable that the ratio of the phosphorus-based compound to the tin-based compound (P/Sn) in the polylactic acid composition is 0.15 to 5.0. This is because when the ratio is within this range, a stereocomplex polylactic acid composition having a high stereocomplex crystallinity and a high stereocomplex crystal melting point, a small stereocomplex crystal melting point depression even after remelting, a small decrease in the molecular weight, excellent forming processability, and also heat resistance can be obtained.

Incidentally, the polylactic acid composition of the invention may also contain an organic acid resulting from the partial reaction between the phosphorus-based compound and the organic acid metal salt, such as lauric acid or benzoic acid.

It is preferable that in DSC measurement satisfying the following conditions, the polylactic acid composition of the invention has a melting point ($T_{sc}$) from stereocomplex crystals of 210° C. or more, and the $Tm_{sc}$ depression ($\Delta T_{sc}$) measured after three cycles is 8° C. or less; this is because the resulting heat resistance and thermal stability are excellent. $\Delta T_{sc}$ is more preferably 5° C. or less, still more preferably 4° C. or less, yet more preferably 3° C. or less, and most preferably 2° C. or less. DSC Measurement Conditions:

(I) Heating from 30° C. to 260° C. (heating rate: 20° C./min);

(II) holding at 260° C. for 1 min;

(III) cooling from 260° C. to 30° C. (cooling rate: 20° C./min); and (IV) the above (I) to (III) are taken as one cycle, and the cycle is repeated three times as three cycles.

The crystal melting enthalpy of the polylactic acid composition of the invention determined by DSC measurement is preferably 20 J/g or more, more preferably within a range of 20 to 80 J/g, and still more preferably 30 to 80 J/g.

The lactide content in the polylactic acid composition of the invention is preferably 0 to 0.1 parts by mass, more preferably 0 to 0.07 parts by mass, and still more preferably 0 to 0.05 parts by mass, relative to 100 parts by mass of the polylactic acid composition.

The molecular weight distribution (Mw/Mn) of the stereocomplex polylactic acid in the polylactic acid composition of the invention is preferably within a range of 1.5 to 2.4, more preferably 1.6 to 2.4, and still more preferably 1.6 to 2.3.

<Additive>

The polylactic acid composition of the invention may contain additives. For example, examples of additives include antihydrolysis agents, crystal nucleators, plasticizers, UV absorbers, antistatic agents, hue regulators, flame retardants, antibacterial agents, and foaming agents.

Among them, antihydrolysis agents are useful as hydrolysis regulators. Specific examples thereof include addition-reaction-type compounds such as carbodiimide compounds, isocyanate compounds, epoxy compounds, oxazoline compounds, oxazine compounds, and aziridine compounds. In addition, although two or more of these compounds may be used in combination, not all of them are usable, and it is important to select compounds that are effective as hydrolysis regulators in the invention.

In addition, of the above compounds, in terms of water resistance and reactivity with the acidic group, carbodiimide compounds are preferable, for example. However, as above, not all carbodiimide compounds are effective as hydrolysis regulators in the invention, and it is important to select, from carbodiimide compounds, compounds that are effective in the invention.

Examples of carbodiimide compounds effective in the invention include those having a basic structure of the below formula (I) or (I).

(In the formula, R and R' are each independently a $C_{1-20}$ aliphatic group, a $C_{3-20}$ alicyclic group, a $C_{5-15}$ aromatic group, or a combination thereof, optionally containing a heteroatom. R and R' may be linked together to form a cyclic structure or two or more cyclic structures in a spiro structure, for example.

(In the formula, R" is a $C_{1-20}$ aliphatic group, a $C_{3-20}$ alicyclic group, a $C_{5-15}$ aromatic group, or a combination thereof, optionally containing a heteroatom. n is an integer of 2 to 1,000.)

In terms of stability or ease of use, aromatic carbodiimide compounds are more preferable. For example, aromatic carbodiimide compounds of the following formulae (III) and (IV) can be mentioned.

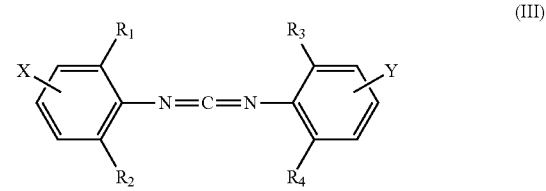

(In the formula, $R_1$ to $R_4$ are each independently a $C_{1-20}$ aliphatic group, a $C_{3-20}$ alicyclic group, a $C_{5-15}$ aromatic group, or a combination thereof, optionally containing a heteroatom. X and Y are each independently a hydrogen atom, a $C_{1-20}$ aliphatic group, a $C_{3-20}$ alicyclic group, a $C_{5-15}$ aromatic group, or a combination thereof, optionally containing a heteroatom. The aromatic rings may be linked together through a substituent to form a cyclic structure or two or more cyclic structures in a spiro structure, for example.

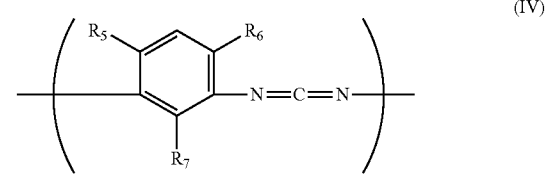

(In the formula, $R_5$ to $R_7$ are each independently a $C_{1-20}$ aliphatic group, a $C_{3-20}$ alicyclic group, a $C_{5-15}$ aromatic group, or a combination thereof, optionally containing a heteroatom. n is an integer of 2 to 1,000.)

Specific examples of such aromatic carbodiimide compounds include bis(2,6-diisopropylphenyl)carbodiimide, polycarbodiimides synthesized by the decarboxylation condensation reaction of 1,3,5-triisopropylbenzene-2,4-diisocyanate and having five or less carbodiimide groups, and combinations thereof.

It is preferable that the content of the carbodiimide compound is 0.1 to 10 parts by mass relative to 100 parts by mass of the polylactic acid composition of the invention.

<Method for Producing Polylactic Acid Composition>

A method for producing the polylactic acid composition of the invention is not particularly limited. Examples thereof include (I) a method in which the phosphorus-based compound, the organic acid metal salt and/or the organic metal salt, and the polylactic acid are simultaneously melt-kneaded; (II) a method in which the polylactic acid containing the phosphorus-based compound is melt-kneaded, and then the organic metal salt is added, followed by melt-kneading again; and (III) a method in which the phosphorus-based compound is added during the production of a poly-L-lactic acid or a poly-D-lactic acid, or both of them, followed by melt-kneading, and then the organic metal salt is added, followed by melt-kneading again. It is preferable that melt-kneading is performed at a temperature of 260 to 300° C. The mass mixing ratio between the poly-L-lactic acid and the poly-D-lactic acid is 80/20 to 20/80 in order to enhance the stereocomplex crystallinity (S) of the polylactic acid.

Thus, according to the invention, the polylactic acid composition of the invention can be produced as follows. That is, the production can be achieved by a method for producing a polylactic acid composition containing a stereocomplex polylactic acid, the stereocomplex polylactic acid containing a poly-L-lactic acid (A) and a poly-D-lactic acid (B) and having a stereocomplex crystallinity (S) of 90% or more as defined by the following equation (a):

$$S = \Delta H_{sc} \times 100/(\Delta H_{ho} + \Delta H_{sc}) \quad (a)$$

wherein $\Delta H_{sc}$ represents the enthalpy (J/g) of stereocomplex crystals in the polylactic acid composition, and $\Delta H_{ho}$ represents the enthalpy (J/g) of homocrystals in the polylactic acid composition, the content ratio between the poly-L-lactic acid (A) and the poly-D-lactic acid (B) being within a range of 80/20 to 20/80 (mass ratio), the method including at least the following steps:

(i) a step of preparing a mixture containing a poly-L-lactic acid (A), a poly-D-lactic acid (B), a tin-based compound, and a phosphorus-based compound;

(ii) a step of adding at least one of an organic acid metal salt of at least one member selected from alkali metals and alkaline earth metals, and an organic metal salt to the mixture of (i) in such a manner that the following conditions are satisfied: in the case where the kind of metal of the organic acid metal salt is an alkali metal, the molar ratio of the phosphorus (P) atom in terms of metal to the organic acid metal salt is within a range of 0.5 to 1.5; in the case where the kind of metal of the organic acid metal salt is an alkaline earth metal, the molar ratio of the phosphorus (P) atom in terms of metal to the organic acid metal salt is within a range of 0.1 to 1.0; and in the case of the organic metal salt, the molar ratio of the phosphorus (P) atom in terms of metal to the organic metal salt is within a range of 0.5 to 2.2; and (iii) a step of, after the step (ii), melt-kneading the mixture at a temperature of 260 to 300° C.

In the step (i), as the poly-L-lactic acid (A), the poly-D-lactic acid (B), the tin-based compound, and the phosphorus-based compound, those same as described above are usable.

A mixture containing them can be prepared, for example, by allowing a predetermined amount of monomer capable of forming an L-lactic acid unit, such as L-lactide, and a predetermined amount of monomer capable of forming a D-lactic acid unit, such as D-lactide, to react with a predetermined amount of tin-based compound, which is a polymerization catalyst, then adding the phosphorus-based compound as a polymerization catalyst deactivator or a coloring inhibitor, and further allowing the mixture to react, followed by removing the lactide as necessary.

As described above, it is preferable that in the step (i), the mass ratio of the phosphorus atom from the phosphorus-based compound to the tin atom from the tin-based compound (P/Sn) is within a range of 0.15 to 5.0.

In the case where the kind of metal of the organic acid metal salt is an alkali metal, the organic acid metal salt is added such that the molar ratio of phosphorus (P) to the organic acid metal salt is within a range of 0.5 to 1.5, preferably within a range of 0.8 to 1.3. In the case where the kind of metal of the organic acid metal salt is an alkaline earth metal, the organic acid metal salt is added such that the molar ratio of phosphorus (P) to the organic acid metal salt is within a range of 0.1 to 1.0, preferably within a range of 0.2 to 0.6. In the case of the organic metal salt, the organic metal salt is added such that the molar ratio of phosphorus (P) to the organic metal salt is within a range of 0.5 to 2.2, preferably within a range of 0.5 to 1.0. As a result, the stereocomplex crystallinity (S) is enhanced, leading to excellent heat resistance. In addition, the polylactic acid composition of the invention can be stably produced.

In the step (iii), in terms of the stability of the polylactic acid during melting and also of improving the stereocomplex crystallinity (S), the melt-kneading temperature is within a range of 260 to 300° C., preferably 260 to 280° C., and more preferably 260 to 275° C.

When melt-kneading is performed in such a mixing ratio at such a temperature, the stereocomplex crystallinity (S) of the polylactic acid can be made 90% or more. The crystallinity (S) of the polylactic acid is preferably 90% to 100%, more preferably 95% to 100%, still more preferably 97% to 100%, and particularly preferably 100%.

The above melt-kneading method can be performed using a conventionally known batch-type or continuous melt-mixer. For example, it is possible to use a melt-stirring tank, a single-screw or twin-screw extruder, a kneader, a non-screw basket-shaped stirring tank (finisher), BIVOLAK manufactured by Sumitomo Heavy Industries, N-SCR manufactured by Mitsubishi Heavy Industries, the spectacle blade, lattice blade, or Kenix-type stirrer manufactured by Hitachi, a tubular polymerizer equipped with a Sulzer SMLX-type static mixer, or the like. However, in terms of productivity and the quality, particularly color tone, of the polylactic acid, a non-screw basket-shaped mixing tank which is a self-cleaning polymerizer, N-SCR, a twin-screw extruder, and the like are preferably used.

Although the polylactic acid composition can be directly melted and processed into a formed article, it is also possible that, as one of preferred embodiments, the polylactic acid composition is once solidified, pelletized, and then processed into a formed article. With respect to the shape of pellets, those having a shape suitable for processing the pellets into a formed article by various forming methods, specifically those having a pellet length of about 1 to 7 mm, a major axis of about 3 to 5 mm, and a minor axis of about 1 to 4 mm, are preferable. In addition, it is preferable that the pellets do not vary much in shape.

In addition to the hydrolysis regulators described above, as desired, the polylactic acid composition of the invention may also contain the following compounds without departing from the gist of the invention. For example, the polylactic acid composition may contain a single kind or two or more kinds of thermoplastic resins other than polylactic acids, thermosetting resins, flexible thermoplastic resins, impact resistance improvers, crystallization promoters, crystallization nucleators, improvers for film formability by electrostatic adhesion, plasticizers, lubricants, organic and inorganic lubricants, organic and inorganic fillers, antioxidants, light stabilizers, UV absorbers, heat stabilizers, release agents, antistatic agents, flame retardants, foaming agents, antibacterial/antifungal agents, colorants containing an organic or inorganic dye or pigment, and the like.

For the application of the above additives to the polylactic acid composition of the invention, the agents may be incorporated at the stage after the start of polylactic acid polymerization and before processing into a formed article. In the case where the agents are added between the start and end of polymerization, an ordinary agent-adding method may be used to allow for the production of a polylactic acid composition. In addition, for adding the agents to a stereocomplex polylactic acid, conventionally known various methods may be preferably used. As such various methods, for example, mixing methods using a tumbler, a V-shaped blender, a super mixer, a Nauta mixer, a Banbury mixer, a kneading roll, a single-screw or twin-screw extruder, and the like are suitably used.

EXAMPLES

Values in the examples were determined by the following methods.
(1) Weight Average Molecular Weight (Mw):

The value was determined from comparison with a polystyrene standard sample by gel permeation chromatography (GPC).

The GPC measuring instrument used was as follows, and a chloroform eluent was used. The eluent was passed through the column at a column temperature of 40° C. and a flow rate of 1.0 mL/min, and a 10-µL sample having a concentration of 1 mg/mL (1% hexafluoroisopropanol-containing chloroform) was injected.

Detector: Differential refractometer, RID-6A manufactured by Shimadzu Corporation Pump: LC-9A manufactured by Shimadzu Corporation Column: TSKgeLG3000HXL, TSKgeLG4000HXL, TSKgeLG5000HXL, and TSKguaRdcoLuMnHXL-L (Tosoh Corporation) were connected in series.

(2) Crystal Melting Point ($T_{ho}$, $T_{sc}$), Crystal Melting Heat ($\Delta H_{ho}$, $\Delta H_{sc}$), Melting Point Depression, and Stereocomplex Crystallinity (S):

Using a polylactic acid composition, the values were measured with a differential scanning calorimeter (DSC) manufactured by PerkinElmer Co., Ltd. That is, in a nitrogen atmosphere, 10 mg of a ample was heated from 30° C. to 260° C. at a heating rate of 20° C./min in the $1^{st}$ RUN, and the crystal melting temperatures ($T_{ho}$, $T_{sc}$) were measured.

The stereocomplex crystal melting point depression ($\Delta T_{sc}$; hereinafter sometimes simply referred to as melting point depression) was defined as a difference in temperature between the stereocomplex crystal melting point (melting point ($T_{sc}$) of the polylactic acid from stereocomplex crystals; hereinafter sometimes simply referred to as melting point) after one cycle and that after three cycles in the above DSC measurement under the following measurement conditions.

DSC Measurement Conditions:

(I) Heating from 30° C. to 260° C. (heating rate: 20° C./min);

(II) holding at 260° C. for 1 min;

(III) cooling from 260° C. to 30° C. (cooling rate: 20° C./min); and (IV) the above (I) to (III) are taken as one cycle, and the cycle is repeated three times as three cycles.

The stereocomplex crystallinity (S) was determined by the following equation (a) from the low-temperature-phase crystal melting heat ($\Delta H_{ho}$) at less than 190° C. and high-temperature-phase crystal melting heat ($\Delta H_{sc}$) at 190° C. or more of the polylactic acid composition.

$$S = \Delta H_{sc} \times 100/(\Delta H_{ho} + \Delta H_{sc}) \tag{a}$$

(In the above equation (a), $\Delta H_{Sc}$ represents the crystal melting enthalpy (J/g) of the crystal melting peak at 190° C. or more corresponding to the melting of the stereocomplex crystal phase in the DSC measurement, while $\Delta H_{ho}$ represents the crystal melting enthalpy (J/g) of the crystal melting peak at less than 190° C. corresponding to the melting of the homocrystal phase in the DSC measurement.)

(3) Optical Purity

The optical purity of a poly-L-lactic acid and that of a poly-D-lactic acid were determined as follows. In the case of a poly-L-lactic acid, the optical purity was determined from the ratio between the L-lactic acid unit, which is the main structural unit, and the partial D-lactic acid unit. First, 5 mL of 5 M sodium hydroxide and 2.5 mL of methanol were added to 1 g of a sample, hydrolyzed with heating and stirring at 40° C., and then neutralized with 1 M sulfuric acid. 1 mL of the neutralized solution was diluted 25-fold to adjust the concentration. The solution was subjected to high-speed liquid chromatography (HPLC) to measure the detection peak areas of L-lactic acid and D-lactic acid under UV light at 254 nm, and, from the mass proportion of the L-lactic acid unit [L] (%) and the mass proportion of the D-lactic acid unit [D](%) forming the polylactic acid polymer, each optical purity (%) was calculated from the following equation.

Incidentally, the HPLC apparatus used was as follows: pump: Shimadzu LC-6A, UV detector: Shimadzu SPD-6AV, column: SUMICHIRAL OA-5000 (Sumika Chemical Analysis Service, Ltd.). A 1 mM aqueous copper sulfate solution was used as the eluent, and measurement was performed at a flow rate of 1.0 mL/min at 40° C.

$$\text{Optical purity (\%) of poly-L-lactic acid} = 100 \times [L]/([L]+[D])$$

$$\text{Optical purity (\%) of poly-D-lactic acid} = 100 \times [D]/([L]+[D])$$

(4) P and Sn Amounts in Terms of Metal:

The amounts of P and Sn in terms of metal were determined by ICP-AES. 7 mL of nitric acid was added to 0.5 mg of a sample placed in a quarts glass container, and treated using Multiwave 3000 manufactured by PerkinElmer Co., Ltd., at an output of 200 W for 5 min and then at an output of 500 W for 45 min. At this time, the final reaction temperature was 190° C., and the internal pressure was 45 bar. The obtained sample was diluted with pure water to 50 mL and subjected to emission spectrometry with VISTA-PRO manufactured by Varian Medical Systems, Inc.

The polylactic acids used in the following examples were produced by the following production methods.

Production Example 1 Production of Poly-L-Lactic Acid 0.014 parts by mass of tin octylate was added to 100 parts by mass of L-lactide (manufactured by Musashino Chemical Laboratory, optical purity: 100%), and, in a nitrogen atmosphere, allowed to react in a reactor equipped with a stirring blade at 180° C. for 2 hours. 0.095 parts by mass of trilauryl phosphite was added, then the remaining lactide was removed at 13.3 Pa, and the mixture was formed into pellets, thereby giving a poly-L-lactic acid.

Mw and $T_{ho}$ of the obtained poly-L-lactic acid were 193,000 and 176.4° C., respectively. The amount of P in terms of metal was 0.00503 parts by mass relative to 100 parts by mass of the obtained poly-L-lactic acid, and the amount of Sn in terms of metal was 0.00403 parts by mass relative to 100 parts by mass of the obtained poly-L-lactic acid. The optical purity was 99.8%.

Production Example 2 to 16

The same operations as in Production Example 1 were performed, except for changing the kind of lactide, the kind of phosphorus-based compound, the amount of tin octylate, and the amount of phosphorus-based compound.

Table 1 shows a summary of the obtained poly-L-lactic acids or poly-D-lactic acids. In the table, "DHPA" stands for dihexylphosphonoethyl acetate.

melting point depression ($\Delta T_{sc}$) was 3.2° C. In addition, Mw was 139,000. The formability into fibers and films was excellent.

Examples 2 to 29

The same operations as in Example 1 were performed, except for changing the kind and amount of polylactic acid used and the kind and amount of organic acid metal salt or organic metal salt.

Table 2 shows a summary of the obtained polylactic acid compositions.

Example 30

The polylactic acid composition obtained in Example 1 was taken in an amount of 100 parts by mass, dried at 80° C. for 5 hours, and then, while adding 9.0 parts by mass of bis(2,6-diisopropylphenyl)carbodiimide as a carbodiimide compound, melt-kneaded in a twin-screw kneader at a cylinder temperature of 230° C. and a feed of 5 kg/h. Next, the mixture was pelletized with a chip cutter, thereby giving a polylactic acid composition.

The obtained polylactic acid composition was subjected to DSC measurement. As a result, the stereocomplex crystallinity (S) was 100.0%, the stereocomplex crystal melting

TABLE 1

| Production Example | Lactide | Lactide Optical Purity (%) | Phosphorus-Based Compound | Lactide Amount (part by mass) | Tin Octylate Amount (part by mass) | Phosphorus-Based Compound Amount (part by mass) | Mw | $T_{ho}$ (° C.) | P Amount (ppm) | Sn Amount (ppm) | Optical Purity of Poly-L- or D-Lactic Acid (%) |
|---|---|---|---|---|---|---|---|---|---|---|---|
| 1 | L-lactide | 100 | Trilauryl phosphite | 100 | 0.014 | 0.095 | 193,000 | 176.4 | 50.3 | 40.3 | 99.8 |
| 2 | L-lactide | 100 | Trilauryl phosphite | 100 | 0.014 | 0.341 | 178,000 | 176.4 | 179.7 | 40.1 | 99.9 |
| 3 | L-lactide | 100 | DHPA | 100 | 0.014 | 0.054 | 182,000 | 175.7 | 50.0 | 40.0 | 99.8 |
| 4 | L-lactide | 100 | Triamyl phosphate | 100 | 0.014 | 0.050 | 188,000 | 176.0 | 49.1 | 40.0 | 99.7 |
| 5 | L-lactide | 97.5 | Trilauryl phosphite | 100 | 0.014 | 0.095 | 187,000 | 168.0 | 50.1 | 39.8 | 97.3 |
| 6 | L-lactide | 100 | Trilauryl phosphite | 100 | 0.014 | 0.019 | 153,000 | 175.3 | 10.3 | 40.2 | 99.6 |
| 7 | L-lactide | 100 | Trilauryl phosphite | 100 | 0.014 | 0.568 | 177,000 | 175.5 | 298.1 | 39.9 | 99.8 |
| 8 | L-lactide | 100 | Trilauryl phosphite | 100 | 0.007 | 0.057 | 167,000 | 176.2 | 30.0 | 20.2 | 99.7 |
| 9 | D-lactide | 100 | Trilauryl phosphite | 100 | 0.014 | 0.095 | 230,000 | 177.1 | 49.9 | 40.1 | 99.9 |
| 10 | D-lactide | 100 | Trilauryl phosphite | 100 | 0.014 | 0.341 | 195,000 | 176.2 | 181.0 | 40.1 | 99.8 |
| 11 | D-lactide | 100 | DHPA | 100 | 0.014 | 0.054 | 188,000 | 175.8 | 51.0 | 39.9 | 99.8 |
| 12 | D-lactide | 100 | Triamyl phosphate | 100 | 0.014 | 0.050 | 189,000 | 175.5 | 49.0 | 40.2 | 99.7 |
| 13 | D-lactide | 97.5 | Trilauryl phosphite | 100 | 0.014 | 0.095 | 181,000 | 168.9 | 50.1 | 39.9 | 97.1 |
| 14 | D-lactide | 100 | Trilauryl phosphite | 100 | 0.014 | 0.019 | 179,000 | 175.8 | 10.0 | 40.1 | 99.9 |
| 15 | D-lactide | 100 | Trilauryl phosphite | 100 | 0.014 | 0.568 | 194,000 | 175.7 | 301.3 | 40.0 | 99.8 |
| 16 | D-lactide | 100 | Trilauryl phosphite | 100 | 0.007 | 0.057 | 168,000 | 175.7 | 30.3 | 20.1 | 99.5 |

Example 1

The poly-L-lactic acid and the poly-D-lactic acid produced in Production Examples 1 and 8, respectively, were taken each in an amount of 50 parts by mass, dried at 80° C. for 5 hours, and then, while adding 0.020 parts by mass of sodium octanoate, melt-kneaded in a twin-screw kneader at a cylinder temperature of 270° C. and a feed of 5 kg/h. Next, the mixture was pelletized with a chip cutter, thereby producing a polylactic acid composition.

The obtained polylactic acid composition was subjected to DSC measurement. As a result, the stereocomplex crystallinity (S) was 100.0%, the stereocomplex crystal melting point $T_{sc}$ was 218.0° C., and the stereocomplex crystal point $T_{sc}$ was 210.9° C., and the stereocomplex crystal melting point depression ($\Delta T_{sc}$) was 1.1° C. In addition, Mw was 136,000.

Comparative Examples 1 to 9

The same operations as in Example 1 were performed, except for changing the kind and amount of polylactic acid used and the kind and amount of organic acid metal salt or organic metal salt.

Table 3 shows a summary of the obtained polylactic acid compositions. Incidentally, "ADK STAB NA-11" in the table is 2,4,8,10-tetra-tert-butyl-6-(sodiooxy)-12H-dibenzo[d,g] [1, 3,3]dioxaphosphocin-6-oxide. "ADK STAB" is a registered trademark.

INDUSTRIAL APPLICABILITY

The stereocomplex polylactic acid composition provided by the invention contains a phosphorus-based compound and a tin-based compound, but has excellent stability and high heat resistance. Therefore, it is usable for various injection-molded products, films, fibers, and various formed products, which are required to have stability and high heat resistance.

TABLE 2

| Example | Poly-L-Lactic Acid Production Example | Poly-D-Lactic Acid Production Example | Poly-L-Lactic Acid/Poly-D-Lactic Acid (mass ratio) | P/Sn (mass %) | Kind of Organic Acid Metal Salt or Organic Metal Salt | Added Amount of Organic Acid Metal Salt or Organic Metal Salt (mass %) | P/Organic Acid Metal Salt or Organic Metal Salt (molar ratio) | Kneading Temperature (° C.) | S (%) | $T_{sc}$ (° C.) | $\Delta T_{sc}$ (° C.) | Mw |
|---|---|---|---|---|---|---|---|---|---|---|---|---|
| Example 1  | 1 | 9  | 50/50 | 1.25 | Sodium octanoate  | 0.020 | 1.35 | 270 | 100.0 | 218.0 | 3.2  | 139,000 |
| Example 2  | 1 | 9  | 50/50 | 1.25 | Sodium octanoate  | 0.050 | 0.54 | 260 | 100.0 | 212.7 | 7.0  | 126,000 |
| Example 3  | 2 | 10 | 50/50 | 4.50 | Sodium octanoate  | 0.080 | 1.21 | 260 | 100.0 | 218.8 | 2.0  | 112,000 |
| Example 4  | 3 | 11 | 50/50 | 1.26 | Sodium octanoate  | 0.020 | 1.35 | 270 | 100.0 | 217.9 | 3.1  | 138,000 |
| Example 5  | 4 | 12 | 50/50 | 1.22 | Sodium octanoate  | 0.020 | 1.32 | 270 | 100.0 | 218.1 | 3.3  | 140,000 |
| Example 6  | 8 | 16 | 50/50 | 1.50 | Sodium octanoate  | 0.011 | 1.47 | 270 | 100.0 | 218.3 | 3.5  | 141,000 |
| Example 7  | 6 | 14 | 50/50 | 0.25 | Sodium octanoate  | 0.010 | 0.55 | 260 | 100.0 | 216.7 | 3.7  | 139,000 |
| Example 8  | 5 | 9  | 50/50 | 1.25 | Sodium octanoate  | 0.020 | 1.34 | 260 | 100.0 | 217.5 | 3.2  | 151,000 |
| Example 9  | 1 | 9  | 50/50 | 1.25 | Potassium laurate | 0.027 | 1.44 | 260 | 100.0 | 216.2 | 3.2  | 146,000 |
| Example 10 | 2 | 10 | 50/50 | 4.50 | Potassium laurate | 0.140 | 0.99 | 260 | 100.0 | 218.7 | 2.2  | 115,000 |
| Example 11 | 1 | 9  | 50/50 | 1.25 | Sodium laurate    | 0.027 | 1.35 | 260 | 97.7  | 217.2 | 3.0  | 151,000 |
| Example 12 | 2 | 10 | 50/50 | 4.50 | Sodium laurate    | 0.130 | 1.00 | 260 | 100.0 | 218.8 | 2.2  | 113,000 |
| Example 13 | 5 | 13 | 50/50 | 1.26 | Sodium laurate    | 0.027 | 1.33 | 260 | 100.0 | 215.4 | 3.1  | 123,000 |
| Example 14 | 6 | 14 | 50/50 | 0.25 | Sodium laurate    | 0.014 | 0.52 | 260 | 100.0 | 216.5 | 4.2  | 150,000 |
| Example 15 | 1 | 9  | 50/50 | 1.25 | Calcium stearate  | 0.100 | 0.98 | 290 | 100.0 | 219.3 | 2.3  | 139,000 |
| Example 16 | 1 | 9  | 50/50 | 1.25 | Calcium stearate  | 0.150 | 0.66 | 260 | 95.7  | 218.2 | 2.5  | 141,000 |
| Example 17 | 1 | 9  | 50/50 | 1.25 | Calcium stearate  | 0.300 | 0.33 | 260 | 100.0 | 217.0 | 6.1  | 113,000 |
| Example 18 | 1 | 9  | 50/50 | 1.25 | Calcium stearate  | 0.500 | 0.20 | 260 | 100.0 | 216.5 | 7.0  | 134,000 |
| Example 19 | 2 | 10 | 50/50 | 4.50 | Calcium stearate  | 1.200 | 0.29 | 260 | 100.0 | 216.3 | 6.4  | 121,000 |
| Example 20 | 1 | 9  | 50/50 | 1.25 | Sodium benzoate   | 0.017 | 1.16 | 260 | 90.4  | 218.3 | 3.3  | 144,000 |
| Example 21 | 1 | 9  | 50/50 | 1.25 | Sodium benzoate   | 0.036 | 0.55 | 260 | 100.0 | 215.3 | 4.5  | 139,000 |
| Example 22 | 2 | 10 | 50/50 | 4.50 | Sodium benzoate   | 0.080 | 0.89 | 260 | 100.0 | 218.5 | 2.5  | 115,000 |
| Example 23 | 1 | 9  | 50/50 | 1.25 | Sodium methoxide  | 0.004 | 2.19 | 290 | 91.6  | 219.2 | 2.6  | 134,000 |
| Example 24 | 1 | 9  | 50/50 | 1.25 | Sodium methoxide  | 0.009 | 0.97 | 260 | 100.0 | 217.1 | 3.2  | 148,000 |
| Example 25 | 6 | 14 | 50/50 | 0.25 | Sodium methoxide  | 0.003 | 0.59 | 260 | 99.1  | 216.6 | 4.1  | 151,000 |
| Example 26 | 1 | 9  | 80/20 | 1.25 | Sodium octanoate  | 0.035 | 0.77 | 260 | 98.2  | 214.4 | 5.1  | 145,000 |
| Example 27 | 1 | 9  | 80/20 | 1.25 | Sodium laurate    | 0.060 | 0.60 | 260 | 99.1  | 213.9 | 6.3  | 142,000 |
| Example 28 | 7 | 15 | 50/50 | 7.49 | Sodium octanoate  | 0.120 | 1.34 | 260 | 100.0 | 208.3 | 11.3 | 95,000  |
| Example 29 | 7 | 15 | 50/50 | 7.49 | Sodium laurate    | 0.160 | 1.34 | 260 | 100.0 | 209.4 | 10.6 | 98,000  |
| Example 30 | 1 | 9  | 50/50 | 1.25 | Sodium octanoate  | 0.02  | 1.2  | 280 | 100.0 | 210.9 | 1.1  | 136,000 |

TABLE 3

| Comparative Example | Poly-L-Lactic Acid Production Example | Poly-D-Lactic Acid Production Example | Poly-L-Lactic Acid/Poly-D-Lactic Acid (mass ratio) | P/Sn (mass %) | Kind of Organic Acid Metal Salt or Organic Metal Salt | Added Amount of Organic Acid Metal Salt or Organic Metal Salt (mass %) | P/Organic Acid Metal Salt or Organic Metal Salt (molar ratio) | Kneading Temperature (° C.) | S (%) | $T_{sc}$ (° C.) | $\Delta T_{sc}$ (° C.) | Mw |
|---|---|---|---|---|---|---|---|---|---|---|---|---|
| Comparative Example 1 | 1 | 9  | 50/50 | 1.25 | ADK STAB NA-11   | 0.300 | 0.27 | 260 | 87.6  | 217.4 | 4.0  | 148,000 |
| Comparative Example 2 | 1 | 9  | 90/10 | 1.25 | Sodium octanoate | 0.050 | 0.54 | 260 | 78.1  | 205.8 | 8.1  | 136,000 |
| Comparative Example 3 | 6 | 14 | 50/50 | 0.25 | Sodium methoxide | 0.009 | 0.20 | 260 | 100.0 | 211.3 | 9.8  | 128,000 |
| Comparative Example 4 | 1 | 9  | 50/50 | 1.25 | Calcium stearate | 0.050 | 1.97 | 260 | 76.6  | 220.4 | 3.3  | 140,000 |
| Comparative Example 5 | 1 | 9  | 50/50 | 125  | Calcium stearate | 1.000 | 0.10 | 260 | 100.0 | 210.3 | 12.7 | 94,000  |
| Comparative Example 6 | 1 | 9  | 50/50 | 1.25 | Sodium octanoate | 0.070 | 0.38 | 260 | 100.0 | 210.9 | 14.4 | 117,000 |
| Comparative Example 7 | 1 | 9  | 50/50 | 1.95 | Sodium octanoate | 0.010 | 2.69 | 260 | 60.2  | 219.6 | 3.9  | 150,000 |
| Comparative Example 8 | 1 | 9  | 50/50 | 1.25 | Sodium laurate   | 0.100 | 0.36 | 260 | 100.0 | 209.9 | 15.4 | 122,000 |
| Comparative Example 9 | 1 | 9  | 50/50 | 1.25 | Sodium laurate   | 0.013 | 2.77 | 260 | 62.3  | 219.1 | 3.9  | 155,000 |

The invention claimed is:

1. A polylactic acid composition comprising a stereocomplex polylactic acid,
the stereocomplex polylactic acid containing a poly-L-lactic acid (A) and a poly-D-lactic acid (B) and having a stereocomplex crystallinity (S) of 90% or more as defined by the following equation (a):

$$S=\Delta H_{sc}\times 100/(\Delta H_{ho}+\Delta H_{sc}) \quad (a)$$

wherein $\Delta H_{sc}$ represents the enthalpy (J/g) of stereocomplex crystals in the polylactic acid composition, and $\Delta H_{ho}$ represents the enthalpy (J/g) of homocrystals in the polylactic acid composition,
the content ratio between the poly-L-lactic acid (A) and the poly-D-lactic acid (B) being within a range of 80/20 to 20/80 (mass ratio),
the polylactic acid composition containing a tin-based compound, a phosphorus-based compound, and further at least one of an organic acid metal salt of at least one member selected from alkali metals and alkaline earth metals, and an organic metal salt,
in the case where the kind of metal of the organic acid metal salt is an alkali metal, the molar ratio of the phosphorus (P) atom to the organic acid metal salt being within a range of 0.5 to 1.5,
in the case where the kind of metal of the organic acid metal salt is an alkaline earth metal, the molar ratio of the phosphorus (P) atom to the organic acid metal salt being within a range of 0.1 to 1.0,
in the case of the organic metal salt, the molar ratio of the phosphorus (P) atom to the organic metal salt being within a range of 0.5 to 2.2, and
wherein the polylactic acid composition has a melting point ($T_{sc}$) from stereocomplex crystals of 210° C. or more, and, in DSC measurement under the following conditions, the difference between $T_{sc}$ measured after three cycles and $T_{sc}$ measured after one cycle ($\Delta T_{sc}$) is 8° C. or less:
DSC measurement conditions:
(i) heating from 30° C. to 260° C. (heating rate: 20° C./min);
(ii) holding at 260° C. for 1 min;
(iii) cooling from 260° C. to 30° C. (cooling rate: 20° C./min); and
(iv) the (i) to (iii) are taken as one cycle, and the cycle is repeated three times as three cycles.

2. The polylactic acid composition according to claim 1, wherein the organic acid of the organic acid metal salt is a $C_{2-24}$ fatty acid.

3. The polylactic acid composition according to claim 1, wherein the composition contains the organic acid metal salt of at least one member selected from alkali metals and alkaline earth metals, and wherein the organic acid of the organic acid metal salt is a $C_{7-12}$ aromatic acid.

4. The polylactic acid composition according to claim 1, wherein the organic metal salt is at least one kind of metal alkoxide selected from the group consisting of $C_{1-10}$ aliphatic alkoxides and $C_{6-15}$ aromatic alkoxides.

5. The polylactic acid composition according to claim 1, wherein the tin-based compound is at least one member selected from the group consisting of tin octylate and tin alkoxides containing a $C_{1-10}$ fatty alcohol as a constituent.

6. The polylactic acid composition according to claim 1, wherein the phosphorus-based compound is at least one kind of phosphorus compound selected from the group consisting of phosphorous acid, phosphoric acid, phosphonic acid, phosphites, phosphates, and phosphonates.

7. The polylactic acid composition according to claim 1, wherein the amount of Sn in terms of metal is 0.02 parts by mass or less relative to 100 parts by mass of the total of the poly-L-lactic acid and the poly-D-lactic acid, and the mass ratio of the phosphorus atom from the phosphorus-based compound to the tin atom from the tin-based compound (P/Sn) is within a range of 0.15 to 5.0.

8. The polylactic acid composition according to claim 1, wherein the polylactic acid composition has a melting point ($T_{sc}$) from stereocomplex crystals of 210° C. or more, and, in DSC measurement under the following conditions, the difference between $T_{sc}$ measured after three cycles and $T_{sc}$ measured after one cycle ($\Delta T_{sc}$) is 5° C. or less:
DSC measurement conditions:
(i) heating from 30° C. to 260° C. (heating rate: 20° C./min);
(ii) holding at 260° C. for 1 min;
(iii) cooling from 260° C. to 30° C. (cooling rate: 20° C./min); and
(iv) the (i) to (iii) are taken as one cycle, and the cycle is repeated three times as three cycles.

9. The polylactic acid composition according to claim 1, wherein the stereocomplex polylactic acid has a weight average molecular weight (Mw) of 100,000 or more.

10. The polylactic acid composition according to claim 1, comprising 0.1 to 10 parts by mass of a compound having at least one carbodiimide group in one molecule relative to 100 parts by mass of the polylactic acid composition.

11. The polylactic acid composition according to claim 1, further comprising an organic acid from the organic acid metal salt.

12. A formed article obtained from the polylactic acid composition according to claim 1.

13. A method for producing a polylactic acid composition comprising a stereocomplex polylactic acid,
the stereocomplex polylactic acid containing a poly-L-lactic acid (A) and a poly-D-lactic acid (B) and having a stereocomplex crystallinity (S) of 90% or more as defined by the following equation (a):

$$S=\Delta H_{sc}\times 100/(\Delta H_{ho}+\Delta H_{sc}) \quad (a)$$

wherein $\Delta H_{sc}$ represents the enthalpy (J/g) of stereocomplex crystals in the polylactic acid composition, and $\Delta H_{ho}$ represents the enthalpy (J/g) of homocrystals in the polylactic acid composition,
the content ratio between the poly-L-lactic acid (A) and the poly-D-lactic acid (B) being within a range of 80/20 to 20/80 (mass ratio),
the method including at least the following steps:
(i) a step of preparing a mixture containing a poly-L-lactic acid (A), a poly-D-lactic acid (B), a tin-based compound, and a phosphorus-based compound;
(ii) a step of adding at least one of an organic acid metal salt of at least one member selected from alkali metals and alkaline earth metals, and an organic metal salt to the mixture of (i) in such a manner that the following conditions are satisfied: in the case where the kind of metal of the organic acid metal salt is an alkali metal, the molar ratio of the phosphorus (P) atom to the organic acid metal salt is within a range of 0.5 to 1.5; in the case where the kind of metal of the organic acid metal salt is an alkaline earth metal, the molar ratio of the phosphorus (P) atom to the organic acid metal salt is within a range of 0.1 to 1.0; and in the case of the organic metal salt, the molar ratio of the phosphorus (P) atom to the organic metal salt is within a range of 0.5 to 2.2; and (iii) a step of, after the step (ii), melt-kneading the mixture at a temperature of 260 to 300° C., wherein the method produces the polylactic acid composition of claim 1.

14. The method for producing a polylactic acid composition according to claim 13, wherein in the step (i), the mass ratio of the phosphorus atom from the phosphorus-based compound to the tin atom from the tin-based compound (P/Sn) is within a range of 0.15 to 5.0.

15. The polylactic acid composition according to claim 2, wherein the amount of Sn in terms of metal is 0.02 parts by mass or less relative to 100 parts by mass of the total of the poly-L-lactic acid and the poly-D-lactic acid, and the mass ratio of the phosphorus atom from the phosphorus-based compound to the tin atom from the tin-based compound (P/Sn) is within a range of 0.15 to 5.0.

16. The polylactic acid composition according to claim 3, wherein the amount of Sn in terms of metal is 0.02 parts by mass or less relative to 100 parts by mass of the total of the poly-L-lactic acid and the poly-D-lactic acid, and the mass ratio of the phosphorus atom from the phosphorus-based compound to the tin atom from the tin-based compound (P/Sn) is within a range of 0.15 to 5.0.

17. The polylactic acid composition according to claim 4, wherein the amount of Sn in terms of metal is 0.02 parts by mass or less relative to 100 parts by mass of the total of the poly-L-lactic acid and the poly-D-lactic acid, and the mass ratio of the phosphorus atom from the phosphorus-based compound to the tin atom from the tin-based compound (P/Sn) is within a range of 0.15 to 5.0.

18. The polylactic acid composition according to claim 5, wherein the amount of Sn in terms of metal is 0.02 parts by mass or less relative to 100 parts by mass of the total of the poly-L-lactic acid and the poly-D-lactic acid, and the mass ratio of the phosphorus atom from the phosphorus-based compound to the tin atom from the tin-based compound (P/Sn) is within a range of 0.15 to 5.0.

19. The polylactic acid composition according to claim 6, wherein the amount of Sn in terms of metal is 0.02 parts by mass or less relative to 100 parts by mass of the total of the poly-L-lactic acid and the poly-D-lactic acid, and the mass ratio of the phosphorus atom from the phosphorus-based compound to the tin atom from the tin-based compound (P/Sn) is within a range of 0.15 to 5.0.

20. The polylactic acid composition according to claim 1, wherein the composition comprises sodium methoxide.

* * * * *